April 5, 1955          J. B. COX          2,705,376

DEPTH GAUGE FOR SAW CHAINS

Filed Nov. 23, 1953

*INVENTOR.*
*JOSEPH B. COX*
BY
*ATTORNEYS*

United States Patent Office 2,705,376
Patented Apr. 5, 1955

2,705,376

DEPTH GAUGE FOR SAW CHAINS

Joseph B. Cox, Portland, Oreg., assignor, by mesne assignments, to Oregon Saw Chain Corp., a corporation of Oregon Application November 23, 1953, Serial No. 393,764

2 Claims. (Cl. 33—202)

The present invention relates to filing gauge and more particularly to a filing gauge adapted for use in adjusting the clearance of the depth gauge of a saw chain tooth.

A great many of the saw chains used today with power chain saws comprise a plurality of longitudinally spaced apart teeth or cutter elements including a toe portion which extends transversely of the chain and slants downwardly toward the rear of the tooth. The leading edge of each of the toe portions is provided with a kerf bottom cutting edge, and a depth gauge is provided between each of the cutter elements to regulate the depth of cut thereof. The distance between a plane defined by the cutting edges of a pair of successive teeth of a straightened chain and the terminus of the depth gauge spaced between the teeth is known as the depth gauge clearance. It will be apparent that as the teeth are resharpened the depth gauge clearance will diminish, by reason of the downward slant of the toe portion, unless the depth gauges of the chain are also filed down. The amount of depth gauge clearance is important to the efficiency of a chain and ordinarily should be adjusted each time the saw chain is sharpened.

It is an object of the present invention to provide a compact, inexpensive filing gauge for use in accurately adjusting the clearance of saw chain depth gauges.

It is a further object of the invention to provide a filing gauge for saw chain depth gauges which is preset for filing clearance of a predetermined amount.

It is another object of the invention to provide a filing gauge that is easily manipulated and maintained in operative position during the filing operation.

Other objects and advantages of the invention will become more apparent hereinafter.

In accordance with the illustrated embodiment, the present invention comprises a channel shaped body adapted to be placed upon the chain and to rest upon the cutting edges of a pair of successive teeth. A filing shoe portion is formed on one end of the body and has an aperture through which is received the depth gauge to be adjusted, the filing shoe having a reference surface to indicate the proper terminus of the depth gauge and which surface acts as a stop to prevent filing the depth gauge beyond the desired amount.

For a more complete description of the invention, reference is made to the accompanying drawings and the following specification.

Figure 1:
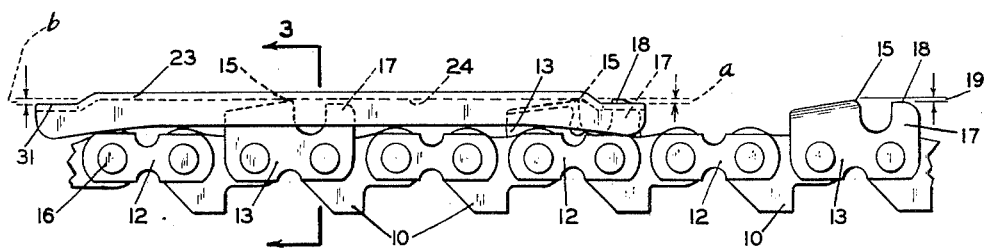
Fig. 1 is a side elevational view of a filing gauge showing it mounted upon a saw chain.
Figure 2:
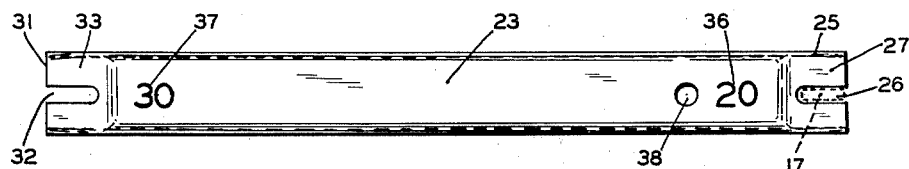
Fig. 2 is a top view of the gauge.

Referring now to the drawings, the device of the invention is illustrated in connection with a saw chain comprising a plurality of centrally disposed sprocket engaging links 10 pivotally joined together by means of pairs of oppositely disposed side plates 12 and 13. Side plates 12 are identical to each other, whereas side plates 13 comprise cutter links or elements and are formed with a toe portion 14 extending at right angles to the longitudinal plane of the chain. The leading edge of each of the toe portions 14 is provided with a kerf bottom cutting edge 15 and it will be seen from Fig. 1 that from the cutting edge the toe portions recede or slope downwardly toward a line through the rivets 16 connecting the links 10 and side plates 12, 13. Also formed on each of the cutter links 13 is a depth gauge 17, the terminus or surface 18 of which is adapted to ride on the bottom of the kerf to regulate the depth of the cut made by the respective tooth. The clearance between the depth gauge terminus 18 and cutting edge 15 of a tooth is indicated at 19. As shown, alternate cutter elements 13 are of right and left configuration. For a further description of a saw chain formed as illustrated, reference is made to my Patent No. 2,508,784, issued May 23, 1950.

Figure 3:
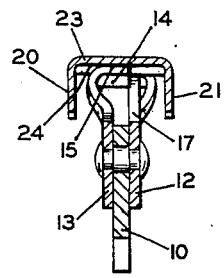
Fig. 3 is a cross-sectional view taken along line 3—3 of Fig. 1.

The filing gauge of the invention comprises an elongate body having a flat cutting edge engaging portion 23 formed with a planar reference surface 24 on the lower side thereof extending longitudinally of the body for a distance at least as great as the spacing between a pair of successive cutter elements 13. The gauge is adapted to be mounted upon a length of straightened saw chain with the reference surface 24 engaging the cutting edges 15 of a pair of successive cutter elements 13, as shown. Preferably depending flanges 20, 21 are provided along the opposite longitudinal edges of cutting edge engaging portion 23 for engaging the opposite sides of the saw chain and retaining the gauge on the chain. Thus in the preferred embodiment of the invention the body is channel or U-shaped in cross section as shown in Fig. 3, the cutting edge engaging portion 23 forming the web of the body.

An end portion of the body is stepped downwardly with respect to the cutting edge engaging portion 23 to define a filing shoe 25 having a slot or aperture 26 provided therein adapted to receive therethrough the depth gauge 18 of the forwardly positioned cutter element of the pair of cutter elements upon which the gauge is resting. The upper surface of the filing shoe 25, as the gauge is shown in Fig. 1, defines a planar reference surface 27 which is substantially parallel to the plane of reference surface 24 and spaced therebelow by a distance $a$ equal to the desired depth gauge clearance 19, which may be, for example, 0.020 inch. After the filing gauge has been positioned, as indicated above, the depth gauge 17 may be filed to the proper clearance by filing off the portion 18 which projects above the surface 27 with a hand file. Preferably the filing shoe 25 is surface hardened to resist wear during the filing of the depth gauge 17.

Frequently, a chain saw user carries two sizes of saw chain to be used selectively with the saw depending upon the cutting operation to be performed. Ordinarily the depth gauge setting or clearance for these chains will differ. For convenience, therefore, the filing gauge may be formed with a filing shoe 31 on the end thereof opposite to the filing shoe 25. The filing shoe 31 is provided with a depth gauge receiving slot 32 and differs from the filing shoe 25 in that the filing shoe surface 33 of the shoe 31 is spaced a distance $b$, for example, 0.030 inch from the reference surface 24. Thus, the saw chain operator need carry only one filing gauge and which is adapted for use with either of the saw chains he carries for his saw. To facilitate identifying the proper filing shoe, identifying numerals 36, 37 may be stamped adjacent a corresponding end of the gauge to indicate the clearance in thousandths of an inch of the respective filing shoe surface.

An opening 38 may be provided through the web 23 so that the filing gauge may be hung on a nail or other suitable projection.

The filing gauge of the invention can be made very economically inasmuch as it can be stamped from sheet metal stock in a single operation, after which the gauge may be surface hardened as by nitriding or other suitable hardening process.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. A filing gauge for use in filing the depth gauges of a saw chain comprising a pluralty of longitudinally spaced apart cutter links each having a kerf bottom cutting edge formed thereon, said depth gauges being spaced between said cutting edges, said filing gauge consisting of a single stamped sheet metal piece defining an elongate body formed with an elongate planar reference surface adapted to engage the cutting edges of a pair of successive cutter links of said saw chain, flange means on the opposite sides of said body for engaging the opposite sides of said saw chain to retain said body in alignment with said saw chain, and a filing shoe formed on one end of said body and integral therewith and having an aperture for receiving a depth gauge of said saw chain therethrough, said filing shoe having a planar gauge surface on the opposite side of said body relative to said reference surface, said gauge surface of said filing shoe being hardened to resist filing wear, said gauge surface being parallel to and spaced from the plane of said reference surface a predetermined distance.

2. A filing gauge for use in filing the depth gauges of a saw chain comprising a plurality of longitudinally spaced apart cutter elements having transversely extending cutting edges and depth gauges spaced between said cutting edges, said filing gauge being stamped from a single piece of sheet metal stock and comprising an elongated channel shaped body having an elongate planar web portion intermediate the ends of said body, and flange portions along the longitudinal edges of the web portion extending substantially normally therefrom said body being adapted to be placed on said chain with the inner surface of said intermediate web portion contacting the cutting edges of a pair of successive cutter elements and with the flange portions of said body positioned one on each of the opposite sides of said cutter elements, a pair of filing shoe portions one on each of the opposite ends of said body, each of said filing shoe portions having a slot for receiving a depth gauge therethrough, the outer surface of the web of each of said filing shoe portions defining a planar filing surface substantially parallel to the plane of said inner surface of said intermediate web portion, each of said filing surfaces being spaced from the plane of said inner surface a different predetermined distance said filing surfaces being hardened to resist filing wear.

References Cited in the file of this patent

UNITED STATES PATENTS

| | | |
|---|---|---|
| 86,837 | Hoffman | Feb. 9, 1869 |
| 749,090 | Olson | Jan. 5, 1904 |
| 2,622,338 | Cox | Dec. 23, 1952 |
| 2,645,859 | Hanson | July 21, 1953 |
| 2,682,791 | Lahaie | July 6, 1954 |